United States Patent
Hu et al.

(10) Patent No.: US 8,355,317 B1
(45) Date of Patent: Jan. 15, 2013

(54) TRANSACTION-BASED COORDINATION OF DATA OBJECT MODIFICATION FOR PRIMARY AND BACKUP CONTROL CIRCUITRY

(75) Inventors: Jie Hu, Santa Rosa, CA (US); Jennifer Anne Smith, Spokane Valley, WA (US); David Henry Gilson, Honolulu, HI (US); Andrew Patrick Schultz, Spokane, WA (US); Michael John Chartier, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 1010 days.

(21) Appl. No.: 11/932,379

(22) Filed: Oct. 31, 2007

(51) Int. Cl.
*H04L 12/26* (2006.01)

(52) U.S. Cl. ............ 370/218; 370/217; 714/11; 714/12

(58) Field of Classification Search .................. None
See application file for complete search history.

(56) References Cited

U.S. PATENT DOCUMENTS

| | | | | |
|---|---|---|---|---|
| 5,710,920 A * | 1/1998 | Maruyama et al. | ............ | 717/108 |
| 5,953,314 A * | 9/1999 | Ganmukhi et al. | ............ | 370/220 |
| 6,941,487 B1 * | 9/2005 | Balakrishnan et al. | ........ | 714/4.5 |
| 7,155,632 B2 * | 12/2006 | Vasavada | ........................ | 714/4.1 |
| 7,245,629 B1 * | 7/2007 | Yip et al. | ....................... | 370/438 |
| 7,280,529 B1 * | 10/2007 | Black et al. | .................... | 370/352 |
| 7,509,400 B1 * | 3/2009 | Tanner et al. | .................. | 709/220 |
| 2002/0080828 A1 * | 6/2002 | Ofek et al. | ..................... | 370/539 |
| 2004/0081104 A1 * | 4/2004 | Pan et al. | ........................ | 370/254 |
| 2004/0083403 A1 * | 4/2004 | Khosravi | ......................... | 714/13 |
| 2005/0050136 A1 * | 3/2005 | Golla | ............................. | 709/200 |
| 2006/0007937 A1 * | 1/2006 | Sharma | .................... | 370/395.21 |

OTHER PUBLICATIONS

Web Page: http://www.saforum.org/home "Service Availability Forum (TM):Home".

* cited by examiner

*Primary Examiner* — Jason Mattis
*Assistant Examiner* — James P Duffy
(74) *Attorney, Agent, or Firm* — Clements Bernard PLLC; Christopher L. Bernard; Lawrence A. Baratta, Jr.

(57) ABSTRACT

Packet switch operating methods and packet switches, using primary control circuitry of the packet switch, receive a request to perform a transaction. In response to the receiving the request, the primary control circuitry forwards the request to backup control circuitry of the packet switch. Subsequent to forwarding the request, the primary control circuitry performs the transaction by modifying a plurality of first data objects stored in a memory of the primary control circuitry. The packet switch operating methods and packet switches, using the primary control circuitry, inform the backup control circuitry that the primary control circuitry has performed the transaction and, in response to the informing, the backup control circuitry performs the transaction by modifying a plurality of second data objects stored in a memory of the backup control circuitry. The first data objects correspond to the second data objects.

26 Claims, 4 Drawing Sheets

TRANSACTION-BASED COORDINATION OF DATA OBJECT MODIFICATION FOR PRIMARY AND BACKUP CONTROL CIRCUITRY

TECHNICAL FIELD

The present invention, in various embodiments, relates to transaction-based coordination of data object modification for primary and backup control circuitry.

BACKGROUND OF THE INVENTION

Packet switches often include a control module used to configure and manage the operation of the packet switch. Some modular packet switches include a chassis into which modules such as control modules and port modules may be installed. In these packet switches, two control modules may be installed to provide redundancy.

One of the control modules may be a primary control module and the other control module may be a backup control module. The primary control module may interact with other modules of the packet switch, thereby configuring and managing the operation of the packet switch. The backup control module may be configured to replace the functionality of the primary control module if the primary control module becomes non-operational. Consequently, the backup control module may configure and manage the operation of the packet switch subsequent to the primary control module becoming non-operational.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

According to one aspect of the invention, a packet switch includes forwarding circuitry configured to forward packets between ports of the packet switch, first control circuitry comprising first memory, and second control circuitry comprising different second memory. The first control circuitry is connected to the forwarding circuitry and is configured to configure the forwarding circuitry. The second control circuitry is connected to the forwarding circuitry and the first control circuitry and is configured to configure the forwarding circuitry when the first control circuitry is non-operational.

For a received request to perform a transaction, the first control circuitry is configured to forward the request to the second control circuitry prior to performing the transaction. The first control circuitry may be configured to generate the request in response to the forwarding circuitry receiving an Ethernet layer-two control packet from one of the ports. The request may result from the forwarding circuitry detecting a topology change in a network to which the packet switch is connected. The request may be received from a user via a management interface of the packet switch.

The first control circuitry is also configured to perform the transaction by modifying a plurality of first data objects stored in the first memory, and to notify the second control circuitry that the transaction has been performed. The first control circuitry may be configured to validate that the first control circuitry is capable of performing the transaction prior to performing the transaction. The first control circuitry may be configured to identify the first data objects for the second control circuitry.

The second control circuitry is configured to receive the request from the first control circuitry and, after being notified that the first control circuitry has performed the transaction, to also perform the transaction by modifying a plurality of second data objects stored in the second memory. The second data objects correspond to the first data objects. The request might not identify the first data objects or the second data objects.

The packet switch may include an input device located on the packet switch. The input device may be configured to be actuated by a user physically located proximate to the packet switch and the second control circuitry may be configured to replace the functionality of the first control circuitry in response to the input device being actuated.

Figure 1:
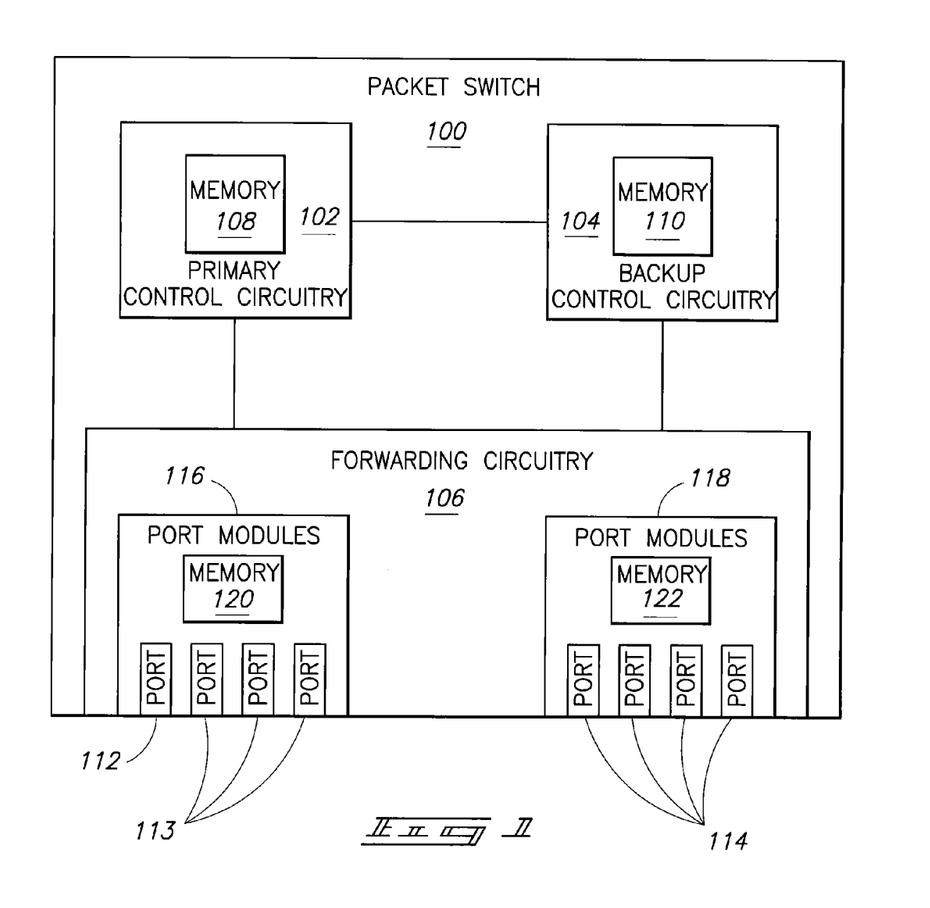
FIG. 1 is a block diagram of a packet switch.

FIG. 1 illustrates a block diagram of a packet switch 100. Packet switch 100 includes primary control circuitry 102, backup control circuitry 104, and forwarding circuitry 106. Primary control circuitry 102 includes memory 108 and backup control circuitry 104 includes memory 110. Forwarding circuitry 106 includes port modules 116 and 118. Port module 116 includes ports 112 and 113 and memory 120. Port module 118 includes ports 114 and memory 122.

Primary control circuitry 102, backup control circuitry 104, and forwarding circuitry 106 may comprise circuitry configured to implement desired programming provided by appropriate media in at least one embodiment. For example, each of primary control circuitry 102, backup control circuitry 104, and forwarding circuitry 106 may be implemented as one or more of a processor and/or other structure configured to execute executable instructions including, for example, software and/or firmware instructions, and/or hardware circuitry. Exemplary embodiments include hardware logic, programmable gate arrays, field programmable gate arrays, application specific integrated circuits, network processing units, state machines, and/or other structures alone or in combination with a processor. These examples are for illustration; other configurations are possible.

Forwarding circuitry 106 may be implemented in many different physical arrangements. For example, forwarding circuitry 106 may have two physically distinct, but electrically connected modules such as modules 116 and 118 illustrated in FIG. 1. In other configurations, forwarding circuitry could include additional port modules (not illustrated) in order to increase the number of ports of packet switch 100. The additional port modules may be added to packet switch 100 on an as-needed basis. In these configurations, forwarding circuitry 106 may include circuitry located on a plurality of different hardware devices.

Memories 108, 110, 120, and 122 may each be embodied in a number of different ways using electronic, magnetic, optical, electromagnetic, or other techniques for storing information. Some specific examples of memory include, but are not limited to, a portable magnetic computer diskette, such as a floppy diskette, zip disk, hard drive, random access memory, read only memory, flash memory, cache memory, and/or other configurations capable of storing programming, data, or other digital information. Memories 108, 110, 120, and 122 may be volatile, non-volatile, or a combination of volatile and non-volatile devices.

Forwarding circuitry 106 may forward packets between ports 112, 113, and 114. For example, forwarding circuitry 106 may receive a packet (e.g., an Ethernet packet) on port 112 and forward the packet to one or more of ports 113 and 114. Forwarding circuitry 106 may be configured to process and forward packets it receives according to one or more protocols, behaviors, or standards.

For example, forwarding circuitry 106 may be configured to implement one or more virtual switches or virtual local area networks (VLANs) that may limit the ports to which forwarding circuitry 106 may forward a packet based on the port on which the packet is received. Further, by way of example illustrating another way in which forwarding circuitry 106 may be configured, forwarding circuitry 106 may be configured to alter the contents and/or length of forwarding information of a packet upon receiving the packet.

A configuration of forwarding circuitry 106 (e.g., one or a combination of the configurations described above or other configurations) may be represented by data stored in a set of forwarding circuitry data objects. The forwarding circuitry data objects may be stored in memory of forwarding circuitry 106 such as memory 120, memory 122, or other memory of forwarding circuitry 106 not illustrated in FIG. 1. For example, forwarding circuitry data objects associated with port module 116 may be stored in memory 120 and forwarding circuitry data objects associated with port module 118 may be stored in memory 122.

Primary control circuitry 102 may configure forwarding circuitry 106 by modifying the data stored by the forwarding circuitry data objects, creating a new forwarding circuitry data object and storing the new forwarding circuitry data object in the memory of forwarding circuitry 106, or deleting a forwarding circuitry data object from the memory of forwarding circuitry 106. In order to communicate with forwarding circuitry 106, primary control circuitry 102 may be electrically connected to forwarding circuitry 106.

Once configured according to the data of the forwarding circuitry data objects, forwarding circuitry 106 may operate according to the configuration and may forward some packets it receives without interacting with primary control circuitry 102. However, forwarding circuitry 106 may forward other packets it receives, such as control protocol packets or management interface packets, to primary control circuitry 102 for further processing.

In addition to processing control packets, primary control circuitry 102 may perform other functions. As was mentioned above, primary control circuitry 102 may configure forwarding circuitry 106. In addition, a user may interact with primary control circuitry 102 in order to provide a configuration for packet switch 100, parts or all of which primary control circuitry 102 may use in configuring forwarding circuitry 106. Furthermore, primary control circuitry 102 may collect statistical information.

In performing these functions, primary control circuitry 102 may create, modify, and/or delete data stored in control circuitry data objects stored in memory 108. For example, a control circuitry data object may store a timer value used in processing layer-two control protocol packets such as Bridge Protocol Data Units (BPDUs) or Connectivity Fault Management Protocol Data Units (CFMPDUs). In one configuration, primary control circuitry 102 may track the state of a particular control protocol by storing the state of the particular control protocol in a control circuitry data object.

Backup control circuitry 104 may be configured to perform substantially the same functions as primary control circuitry 102 described above. However, backup control circuitry 104 might perform some of the functions, such as functions involving interaction with forwarding circuitry 106, only when primary control circuitry 102 is non-operational. For example, if primary control circuitry 102 loses power, becomes unresponsive, or is purposely configured to be non-operational, backup control circuitry 104 may begin performing the functions previously performed by primary control circuitry 102 (e.g., configuring forwarding circuitry 106, interacting with a user, processing control packets, etc.).

Accordingly, backup control circuitry 104 may be inactive during periods of time when primary control circuitry 102 is operational and active during periods of time when primary control circuitry 102 is non-operational. For example, when primary control circuitry 102 is operational, backup control circuitry 104 might not communicate with forwarding circuitry 106. In contrast, when primary control circuitry 102 is non-operational, backup control circuitry 104 may communicate with forwarding circuitry 106 in place of primary control circuitry 102. In order to communicate with forwarding circuitry 106, backup control circuitry 104 may be electrically connected to forwarding circuitry 106.

A user may intentionally activate backup control circuitry 104 and configure primary control circuitry 102 to be non-operational. For example, packet switch 100 may include an input device such as a button or switch (not illustrated) which, when actuated, may activate backup control circuitry 104 so that backup control circuitry 104 subsequently performs the functions previously performed by primary control circuitry 102.

In order to reduce an amount of time between primary control circuitry 102 becoming non-operational and backup control circuitry 104 being activated and taking over the functionality of primary control circuitry 102, backup control circuitry 104 may carefully monitor primary control circuitry 102 to detect whether primary control circuitry 102 is operational. Similarly, primary control circuitry 102 may carefully monitor backup control circuitry 104 to detect whether backup control circuitry 104 is operational. Primary control circuitry 102 and backup control circuitry 104 may be electrically connected to each other to facilitate monitoring and communication.

In one configuration, primary control circuitry 102 may be directly connected to backup control circuitry 104. Alternatively primary control circuitry 102 may be connected to backup control circuitry 104 via a network internal to packet switch 100. Other connectivity configurations are also possible.

Backup control circuitry 104 includes memory 110 and stores control circuitry data objects in memory 110. In one configuration, primary control circuitry 102 may store a set of control circuitry data objects in memory 108 and backup control circuitry 104 may store a matching set of control circuitry data objects in memory 110. The control circuitry data objects may match, for example, because they may have the same names or identifiers. The matching sets of control circuitry data objects may store matching sets of data. To do so, modifications made to the data stored by the set of control circuitry data objects of primary control circuitry 102 may also be made to the data stored by the set of control circuitry data objects of backup control circuitry 104.

When data stored by the matching sets of control circuitry data objects also matches, backup control circuitry 104 may be able to takeover for primary control circuitry 102 and operate using data matching the data that primary control circuitry 102 was using prior to the takeover. For example, primary control circuitry 102 may include a processor on which a software application is executing. The software application may interact with the control circuitry data objects stored in memory 108 by storing and retrieving data from the control circuitry data objects. Backup control circuitry 104 may include a different processor on which a copy of the software application is executing. The software application copy may interact with the control circuitry data objects stored in memory 110. To synchronize the data stored by the control circuitry data objects of memory 108 and the control circuitry data objects of memory 110, primary control circuitry 102 and backup control circuitry 104 may use transactions.

Figure 2:
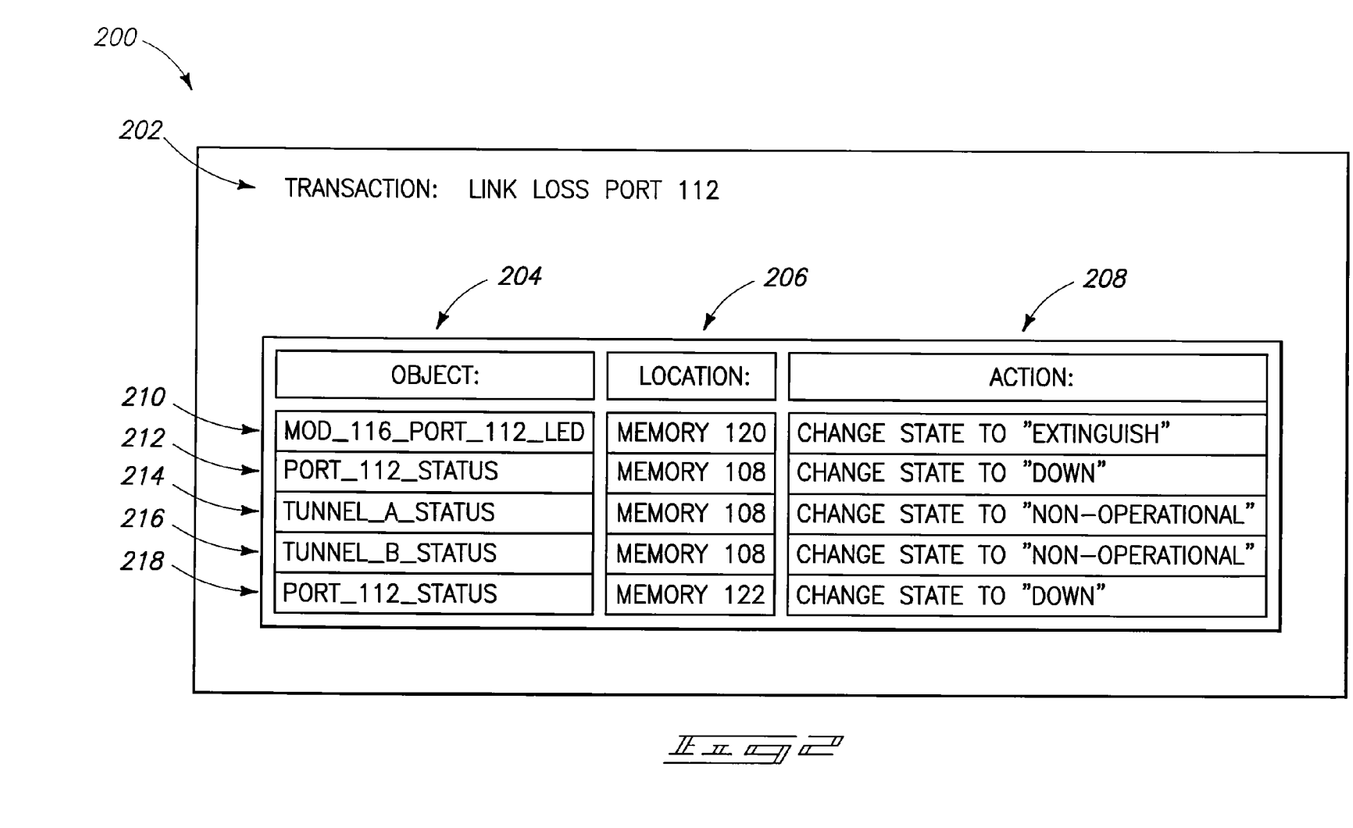
FIG. 2 is a chart illustrating data objects associated with a transaction.

FIG. 2 depicts a chart 200 illustrating a transaction 202. In the example depicted in FIG. 2, transaction 202 is a link loss event. In this example, packet switch 100 has detected that port 112 of forwarding circuitry 106 has lost link. In response to detecting loss of link, a number of actions may be performed.

For example, a link LED of packet switch 100 may be extinguished in order to visually convey the fact that there is no link on port 112. Furthermore, a tunnel relayed by port 112 may be marked as non-operational so that a backup tunnel may be activated. Accordingly, performing transaction 202 may involve modifying one or more data objects.

Chart 200 illustrates data objects 204 that may be modified in performing transaction 202, locations 206 where data objects 204 are stored, and actions 208 to be taken in modifying data objects 204. Although the modifications illustrated in chart 200 are modifications to existing data objects, a modification involving creating a data object or deleting a data object may also be included in the transaction. Row 210 illustrates that part of performing transaction 202 may be changing the state of a "MOD_116_PORT_112_LED" object stored in memory 120 (of forwarding circuitry 106) to "extinguish." Doing so may consequently extinguish an LED of forwarding circuitry 106 and visibly convey the state of port 112.

Row 212 illustrates that another part of performing transaction 202 may be changing the state of a "PORT_112_STATUS" data object stored in memory 108 to "down." Memory 108 may store this data object and use this data object when interacting with a user or a management system. For example, primary control circuitry 102 may provide the data stored by the "PORT_112_STATUS" data object to a management system in response to receiving an SNMP get message for an object identifier corresponding with the "PORT_112_STATUS" data object.

Rows 214 and 216 illustrate that another part of performing transaction 202 may be changing the state of data objects related to tunnels "A" and "B" relayed by port 112 to "non-operational." Doing so may alert a user or management system that tunnels "A" and "B" are no longer relaying packets.

Row 218 illustrates that another part of performing transaction 202 may be changing the state of a "PORT_112_STATUS" data object stored in memory 112 to "down." Memory 122 may store this data object and forwarding circuitry 106 may use this data object when determining whether to forward packets to port 112. Note that memory 108 and memory 122 may each store a data object containing a status of port 112 but each may use the data stored by the data object for different purposes.

Accordingly, performing transaction 202 may involve modifying one or more data objects. Primary control circuitry 102 may receive a request to perform transaction 202 from forwarding circuitry 106. For example, forwarding circuitry 106 may detect loss of link on port 112 and in response may send the request to perform transaction 202 to primary control circuitry 102. Alternatively, primary control circuitry 102 may itself generate the request to perform transaction 202.

Upon receiving the request to perform transaction 202, primary control circuitry 102 may forward the request to backup control circuitry 104. Furthermore, primary control circuitry 102 may determine objects 204, locations 206, and actions 208. For example, the request may contain only transaction 202 (or a transaction identifier associated with the transaction) and might not contain objects 204, locations 206, and actions 208. Once objects 204, locations 206, and actions 208 have been determined, primary control circuitry 102 may perform the transaction by modifying objects 204 according to actions 208.

After performing the transaction, primary control circuitry 102 may notify backup control circuitry 104 that primary control circuitry 102 has performed the transaction. Upon being notified, backup control circuitry 104 may perform the transaction with respect to data objects stored in memory 110. For example, backup control circuitry 104 may modify a "PORT_112_STATUS" data object stored in memory 110 that corresponds to the "PORT_112_STATUS" data object stored in memory 108 so that the data stored by the two data objects named "PORT_112_STATUS" matches.

Backup control circuitry 104 may similarly modify "TUNNEL_A_STATUS" and "TUNNEL_B_STATUS" data objects stored in memory 110 that correspond to the "TUNNEL_A_STATUS" and "TUNNEL_B_STATUS" data objects stored in memory 108. Consequently, "PORT_112_STATUS," "TUNNEL_A_STATUS," and "TUNNEL_B_STATUS" data objects stored in memories 108 and 110 may be synchronized (i.e., in agreement).

Note that backup control circuitry 104 need not modify the "MOD_116_PORT_112_LED" data object stored in memory 120 if it has already been modified by primary control circuitry 102. Similarly, backup control circuitry 104 need not modify the "PORT_112_STATUS" data object stored in memory 122.

Furthermore, note that primary control circuitry 102 may notify backup control circuitry 104 after primary control circuitry 102 has completed transaction 202 rather than separately notifying backup control circuitry 104 after completing individual changes to each of data objects 204. Synchronizing data stored in data objects of primary control circuitry 102 and backup control circuitry 104 in this manner, on a transaction basis, may be beneficial when compared to synchronizing data on a data object basis.

Synchronizing on a transaction basis may simplify debugging of software running on primary control circuitry 102 and backup control circuitry 104. Typically, a plurality of different transactions may each involve modifying a particular data object. For example, data object "TUNNEL_A_STATUS" may be modified as part of a transaction involving link loss, as was described above. In addition, data object "TUNNEL_A_STATUS" may be modified while performing a transaction involving a power failure of module 120, a transaction processing a BPDU that alters the state of port 112, and/or a transaction processing a CFMPDU that alters the state of port 112.

Accordingly, if primary control circuitry 102 and backup control circuitry 104 were to synchronize on a data object basis, and primary control circuitry 102 became non-operational immediately before, immediately after, or while modifying data object "TUNNEL_A_STATUS," someone attempting to determine why primary control circuitry 102 became non-operational might not be able to tell why primary control circuitry 102 was modifying data object "TUNNEL_A_STATUS" since a recorded history (e.g., a log) generated by primary control circuitry 102 may indicate that primary control circuitry 102 was attempting to modify data object "TUNNEL_A_STATUS" but might not indicate a transaction the modification is associated with.

Consequently, the person may need to examine code for many or all of the transactions involving data object "TUNNEL_A_STATUS" to determine why primary control circuitry 102 became non-operational. In contrast, when using transactions, the person may identify a transaction that primary control circuitry 102 was processing when primary control circuitry 102 became non-operational since a recorded history for primary control circuitry 102 may be generated in terms of transactions rather than data objects, thereby simplifying debugging.

Furthermore, synchronizing on a transaction basis may prevent corruption of data stored by control circuitry data objects of backup control circuitry 104. When synchronizing on a transaction basis, backup control circuitry 104 might not perform a transaction until after being notified that primary control circuitry 102 has performed the transaction. Consequently, backup control circuitry 104 can choose to perform or not perform all of the data object modification associated with a transaction.

In contrast, if synchronization were to take place on a data object basis, when backup control circuitry 104 is activated in response to detecting that primary control circuitry 102 is non-operational, some of the data object modification associated with a transaction might be complete and some of the data object modification might not be complete. If backup control circuitry 104 is unable to correct this problem, the data stored by the data objects may remain corrupted and may lead to undesired behavior.

For example, if transaction 202 was synchronized on a data object basis, the modifications described by rows 210 and 218 might be completed by both primary control circuitry 102 and backup control circuitry 104 prior to primary control circuitry 102 becoming non-operational. When backup control circuitry 104 is activated in response to primary control circuitry 102 becoming non-operational, backup control circuitry 104 might not know that the modifications described by rows 214, 216, and 218 were not performed since backup control circuitry 104 might not be aware that transaction 202 was being performed when primary control circuitry 102 became non-operational. Accordingly, packet switch 100 may operate in a state in which port 112 is non-operational due to loss of link yet the status of tunnel "A" and tunnel "B" may be incorrectly designated as "operational" because the modifications described by rows 214 and 216 were not performed by backup control circuitry 104.

In some cases, performing an audit of data stored by the data objects in conjunction with data-object based synchronization may reveal this discrepancy. However, performing a data audit may be time consuming and may extend the amount of time during which neither primary control circuitry 102 nor backup control circuitry 104 is available since the audit may need to be performed prior to activating backup control circuitry 104. Furthermore, auditing might not be able to uncover all possible data corruption.

According to another aspect of the invention, a packet switch operating method includes using primary control circuitry of the packet switch to receive a request to perform a transaction. The request may be generated by the primary control circuitry.

Performing the transaction using the primary control circuitry includes modifying a plurality of first data objects stored in a memory of the primary control circuitry. The memory may be volatile memory and the primary control circuitry performing the transaction may include creating, deleting, or altering the first data objects.

The method also includes the primary control circuitry forwarding the request to backup control circuitry of the packet switch in response to receiving the request and the primary control circuitry performing the transaction by modifying the first data objects subsequent to the forwarding. The method may also include the primary control circuitry validating the transaction prior to performing the transaction by determining that the primary control circuitry has adequate resources to perform the transaction.

The method also includes using the primary control circuitry to inform the backup control circuitry that the primary control circuitry has performed the transaction. Informing the backup control circuitry that the primary control circuitry has performed the transaction may include identifying the modified first data objects for the backup control circuitry.

The method also includes the backup control circuitry performing the transaction by modifying a plurality of second data objects stored in a memory of the backup control circuitry in response to the informing. The first data objects correspond to the second data objects. The request might not identify the first data objects or the second data objects.

Programming configured to cause processing circuitry to perform the method may be included on an article of manufacture, such as a compact disc (CD), digital versatile disc (DVD), a hard disk drive, a memory chip, or other memory device.

Figure 3:
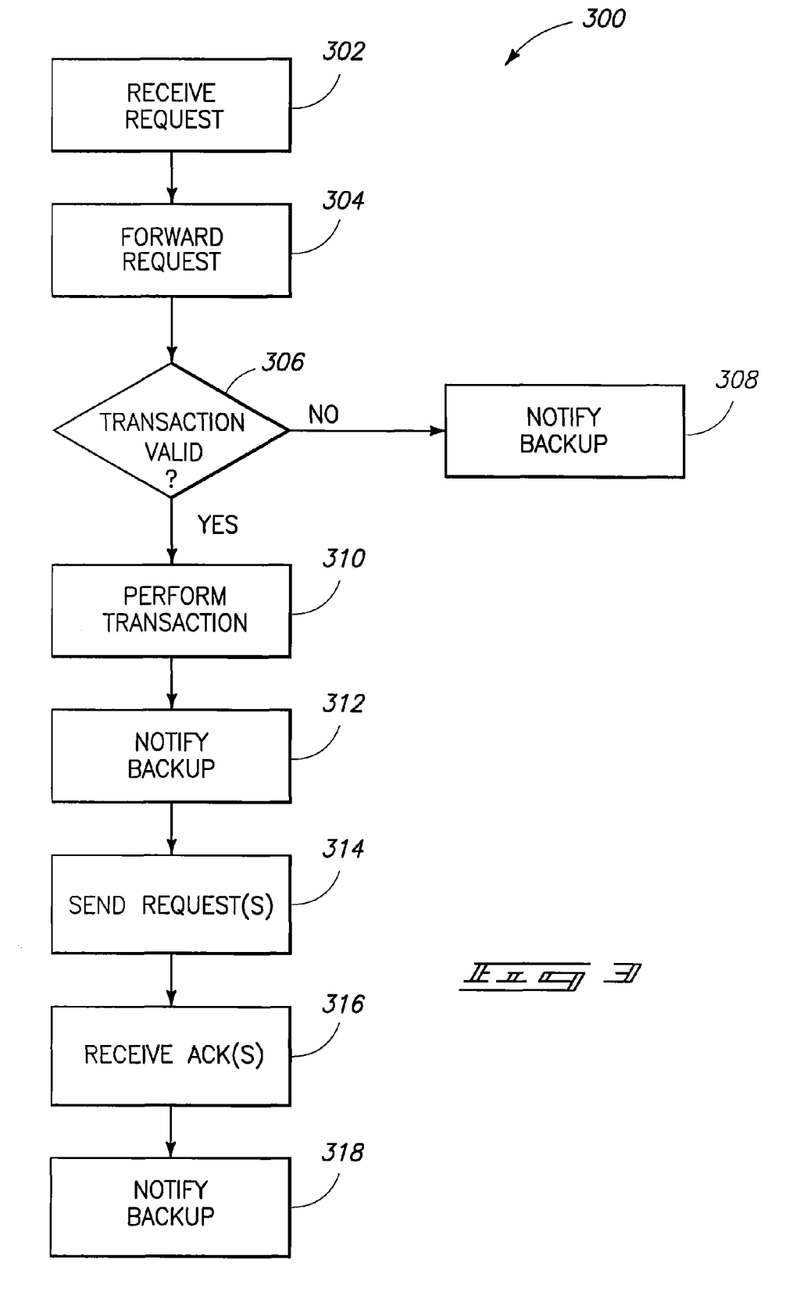
FIG. 3 is a flow chart diagram of a method in accordance with an aspect of the invention.

FIG. 3 is a flow chart diagram of a method 300. At 302, primary control circuitry 102 may receive a request to perform a transaction. The request may be generated internally by primary control circuitry 102. Alternatively, the request may be generated by forwarding circuitry 106 or by other circuitry of packet switch 100. By way of example, the request may be generated by a network operator who requests a configuration change to packet switch 100 via a management interface of packet switch 100.

In one configuration, the request may result from forwarding circuitry 106 receiving an Ethernet layer-two control packet on one of ports 112, 113, or 114. For example, forwarding circuitry 106 may receive a BPDU indicating a topology change in a network to which packet switch 100 is connected.

As was described above, the request might not identify data object modifications that need to take place to perform the transaction. Instead, the request may include a transaction identifier and primary control circuitry 102 may determine the data object modifications based on the transaction identifier. As was mentioned above, the data object modifications may involve altering an existing data object, creating a new data object, or deleting an existing data object. For example, primary control circuitry 102 may execute instructions configured to receive the transaction identifier and generate a set of data object modifications corresponding to the transaction identifier. In some configurations, primary control circuitry 102 may determine that performing the transaction will involve modifying forwarding circuitry data objects and control circuitry data objects.

At 304, primary control circuitry 102 may forward the request to backup control circuitry 104. At 306, primary control circuitry 102 may determine whether the transaction may be performed without error. In doing so, primary control circuitry 102 may first determine data object modifications associated with the transaction and then determine whether packet switch 100 has adequate resources to perform the data object modifications.

For example, upon receiving a request to perform transaction 202, primary control circuitry 102 may determine objects 204 and actions 208 and may then validate actions 208. Primary control circuitry 102 may, for example, determine whether object "MOD_116_PORT_112_LED" is stored in memory 108 and whether tunnel "A" and tunnel "B" exist. Validating may be useful in preventing transactions that could generate errors or corrupted data from being performed by primary control circuitry 102 or primary control circuitry 102 and backup control circuitry 104.

If primary control circuitry 102 determines that one or more of the data object modifications associated with the transaction is invalid, primary control circuitry 102 may, at 308, notify backup control circuitry 104. In response, backup control circuitry 104 may discard the transaction request.

At 310, primary control circuitry 102 may perform the transaction by performing the data object modifications associated with the transaction. In one configuration, primary control circuitry 102 may make modifications to control circuitry data objects stored in memory 108 but might not make modifications to forwarding circuitry data objects stored in memory of forwarding circuitry 106 (e.g., memories 120 and 122).

Prior to performing the transaction, primary control circuitry 102 may indicate to a recorded history (e.g., a log) that the transaction request was received and that primary control circuitry 102 attempted to perform the transaction. Similarly, after performing the transaction, primary control circuitry 102 may indicate to the recorded history that the transaction was performed. The recorded history may be useful in understanding situations in which primary control circuitry 102 becomes non-operational.

After performing the transaction, primary control circuitry 102 may, at 312, notify backup control circuitry 104 that primary control circuitry 102 has performed the transaction (or a portion of the transaction if primary control circuitry 102 has not yet modified forwarding circuitry data objects). The notification may include a list of the data object modifications that primary control circuitry 102 made in performing the transaction.

At 314, if primary control circuitry 102 has not yet performed modifications to the forwarding circuitry data objects, primary control circuitry 102 may request that forwarding circuitry 106 modify the forwarding circuitry data objects associated with the transaction. Primary control circuitry 102 might not make the forwarding circuitry data object modifications itself because primary control circuitry 102 might not have access to memory of forwarding circuitry 106.

At 316, primary control circuitry 102 may receive acknowledgement from forwarding circuitry 106 that forwarding circuitry 106 modified the forwarding circuitry data objects associated with the transaction. In response, primary control circuitry 102 may, at 318, notify backup control circuitry 104 that the forwarding circuitry data object modifications are complete. Next, primary control circuitry 102 may wait to receive an additional request to perform an additional transaction. Once primary control circuitry 102 has received the additional request, method 300 may be repeated for the additional transaction.

According to another aspect of the invention, a packet switch operating method includes receiving a request to perform a transaction from primary control circuitry of the packet switch using backup control circuitry of the packet switch. Performing the transaction includes modifying a plurality of first data objects stored in a memory of the backup control circuitry if the transaction is performed by the backup control circuitry. Performing the transaction includes modifying a plurality of second data objects stored in a memory of the primary control circuitry if the transaction is performed by the primary control circuitry. The first data objects correspond to the second data objects.

The method also includes using the backup control circuitry, determining that the primary control circuitry has performed the transaction and subsequently performing the transaction using the backup control circuitry.

The method may include storing the request in a queue prior to the determining. The queue may be configured to store a plurality of transaction requests simultaneously.

Determining that the primary control circuitry has performed the transaction may include the backup control circuitry receiving a notification that the primary control circuitry has performed the transaction. The notification may identify the second data objects modified by the primary control circuitry as a result of the primary control circuitry performing the transaction.

The request may include a transaction identifier and the method may include the backup control circuitry identifying the first data objects based on the transaction identifier and determining how each of the first data objects is to be modified.

Performing the transaction may involve modifying at least one third data object stored in a memory of forwarding circuitry of the packet switch. The forwarding circuitry may be configured to communicate with both the primary control circuitry and the backup control circuitry and to forward packets between ports of the packet switch.

The method may also include, subsequent to the performing, the backup control circuitry determining that the primary control circuitry is non-operational. The backup control circuitry may be configured to automatically replace functionality of the primary control circuitry if the primary control circuitry becomes non-operational.

The method may also include, subsequent to the determining that the primary control circuitry is non-operational, the backup control circuitry determining that the at least one third data object stored in the memory of the forwarding circuitry has not been modified to comply with the request and the backup control circuitry instructing the forwarding circuitry to modify the at least one third data object stored in the memory of the forwarding circuitry to comply with the request.

Figure 4:
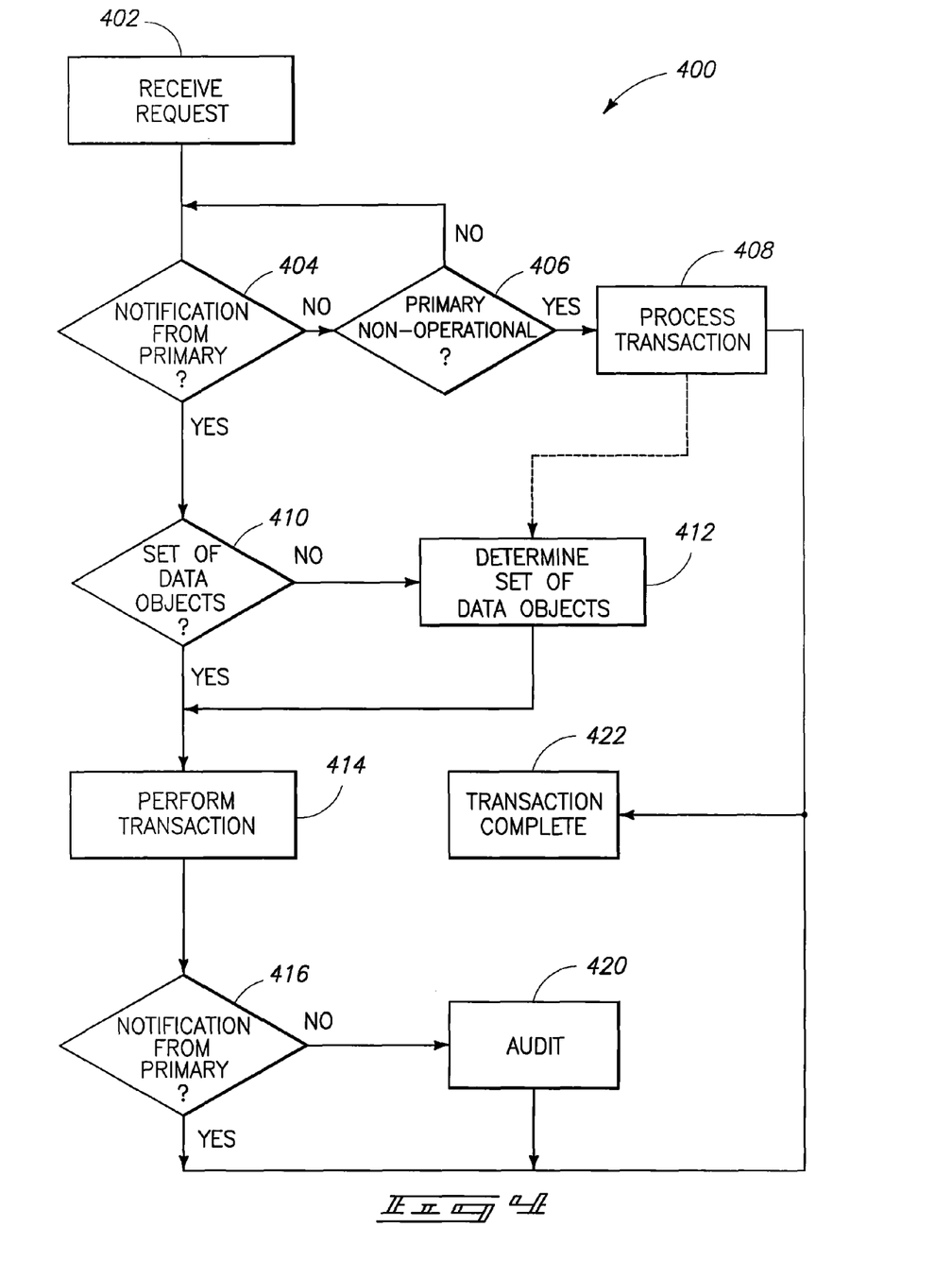
FIG. 4 is a flow chart diagram of a method in accordance with another aspect of the invention.

FIG. 4 is a flow chart diagram of a method 400 in accordance with one or more aspects of the invention. At 402, backup control circuitry 104 may receive a request to perform a transaction (e.g., from primary control circuitry 102). Backup control circuitry 104 may store the transaction request in a queue. The queue may contain more than one pending transaction request. The transaction requests may include time stamps, sequence numbers, or other identifiers that may enable backup control circuitry 104 to determine a chronological order in which backup control circuitry 104 received the transaction requests so that backup control circuitry 104 may process the transaction requests in the order in which they were received.

At 404, backup control circuitry 104 may determine whether a notification that primary control circuitry 102 has performed the transaction has been received. In one configuration, backup control circuitry 104 may receive the notification from primary control circuitry 102. If the notification has not been received, backup control circuitry 104 may determine, at 406, whether primary control circuitry 102 has become non-operational. For example, backup control circuitry 104 may determine whether a heartbeat signal has been recently received from primary control circuitry 102.

If backup control circuitry 104 determines that primary control circuitry 102 is operational, backup control circuitry 104 may continue to wait for a notification. Once backup control circuitry 104 receives notification that primary control circuitry 102 has performed the transaction (or, as was discussed above, at least portions of the transaction involving control circuitry data objects), backup control circuitry 104 may determine, at 410, whether the notification contains a list of the data objects associated with the transaction. In one configuration, the notification may contain a list of both control circuitry data objects associated with the transaction and forwarding circuitry data objects associated with the transaction.

If the notification does not contain a list of the data objects associated with the transaction, backup control circuitry 104 may, at 412, determine the data objects associated with the transaction based on the transaction. For example, primary control circuitry 102 may execute instructions configured to generate a set of data object modifications corresponding to the transaction request.

At 414, backup control circuitry 104 may perform the transaction by modifying control circuitry data objects stored in memory 110 associated with the transaction. For example, in performing transaction 202, backup control circuitry 104 may modify a "MOD_116_PORT_112_LED" object stored in memory 110. The "MOD_116_PORT_112_LED" object stored in memory 110 may correspond to the "MOD_116_PORT_112_LED" object stored in memory 108 described above. In other words, there may be two instances of a "MOD_116_PORT_112_LED" object, one stored in memory 108 of primary control circuitry 102 and one stored in memory 110 of backup control circuitry 104.

Once backup control circuitry 104 has modified the instance of the "MOD_116_PORT_112_LED" object stored in memory 110, the instance of the "MOD_116_PORT_112_LED" object stored in memory 110 may match the instance of the "MOD_116_PORT_112_LED" object stored in memory 108 since backup control circuitry 104 previously received notification, at 404, that the "MOD_116_PORT_112_LED" object stored in memory 108 has been modified according to the transaction.

Backup control circuitry 104 might not perform forwarding circuitry data object modifications associated with the transaction if primary control circuitry 102 performs the forwarding circuitry data object modifications because such modification may only need to be made once. Furthermore, performing the forwarding circuitry data object modifications twice (once by primary control circuitry 102 and once by backup control circuitry 104) may have undesired effects. For example, statistical data may be inaccurate and/or state machines may be inadvertently reset.

Backup control circuitry 104 might not validate the transaction prior to performing the transaction. If backup control circuitry 104 performs the transaction at 414 of method 400 subsequent to receiving notification at 404 that primary control circuitry 102 has performed the transaction, and if primary control circuitry 102 performs the transaction at 310 of method 300 subsequent to validating the transaction at 306, the transaction will have been validated (by primary control circuitry 102) prior to backup control circuitry 104 performing the transaction at 414. Thus, backup control circuitry 104 might not need to re-validate the transaction.

At 416, backup control circuitry 104 may determine whether it has received notification that forwarding circuitry data object modifications associated with the transaction have been performed. In one configuration, the notification may be received from primary control circuitry 102. Alternatively or additionally, forwarding circuitry 106 may be configured to notify both primary control circuitry 102 and backup control circuitry 104 after modifying the forwarding circuitry data objects associated with the transaction. Accordingly, the notification may be received from forwarding circuitry 106. If the notification has been received, at 422, the transaction is complete and backup control circuitry 104 may remove the transaction request from the queue.

According to another aspect of the invention, a packet switch operating method includes receiving a request to perform a transaction from primary control circuitry of the packet switch using backup control circuitry of the packet switch. Performing the transaction using the backup control circuitry involves modifying a plurality of data objects stored in a memory of the backup control circuitry.

The method also includes, subsequent to the receiving, the backup control circuitry determining that the primary control circuitry has become non-operational. The backup control circuitry is configured to automatically replace functionality of the primary control circuitry if the primary control circuitry becomes non-operational. The method also includes, subsequent to the determining, the backup control circuitry processing the transaction.

The request might not identify the data objects. Processing the transaction may include discarding the request and indicating that the transaction was not performed. Alternatively, processing the transaction may include identifying the data objects, determining how each of the data objects is to be modified, modifying the data objects, and indicating that the transaction was performed.

The primary control circuitry may receive the request prior to sending the request to the backup control circuitry. The method may also include determining that prior to becoming non-operational, the primary control circuitry had not received an additional transaction request subsequent to the primary control circuitry receiving the request.

Returning now to FIG. 4, if, at 404, backup control circuitry 104 has not received notification from primary control circuitry 102 that the transaction has been performed, backup control circuitry 104 may determine whether primary control circuitry 102 is operational. If backup control circuitry 104 determines that primary control circuitry 102 is non-operational, backup control circuitry 104 may be activated, thereby replacing the functionality of primary control circuitry 102. In addition, backup control circuitry 104 may, at 408, process the transaction request.

In some configurations, backup control circuitry 104 may be configured to process the transaction request by discarding the transaction request and indicating to a recorded history that backup control circuitry 104 did not perform the transaction. This may prevent backup control circuitry 104 from becoming non-operational. For example, the fact that backup control circuitry 104 received the transaction request but did not receive a notification that primary control circuitry 102 performed the transaction may indicate that primary control circuitry 102 became non-operational while attempting to perform the transaction. Attempting to perform the transaction may have caused the non-operational state. Accordingly, if backup control circuitry 104 is allowed to process the transaction it too may become non-operational.

In other configurations, backup control circuitry 104 may be configured to process the transaction request by performing the transaction as was described above. Since, in this example, backup control circuitry 104 might not have received notification from primary control circuitry 102, backup control circuitry 104 might not know the data object modifications associated with the transaction. Consequently, at 412, backup control circuitry 104 may determine the data object modifications associated with the transaction prior to performing the transaction.

By way of example, backup control circuitry 104 may be configured to process some transaction requests it receives by discarding the requests as was described above and may be configured to perform other transactions it receives (also described above). In some configurations, backup control circuitry 104 may refer to a transaction identifier of the transaction request to determine whether to discard or perform a particular transaction request.

Next, at 414, backup control circuitry 104 may perform the transaction by modifying the control circuitry data objects associated with the transaction that are stored in memory 110. At 416, backup control circuitry 104 may determine whether it has received notification that forwarding circuitry data objects associated with the transaction have been modified.

Since primary control circuitry 102 is non-operational, in this example, the notification might not come from primary control circuitry 102. However, in one configuration, forwarding circuitry 106 may notify backup control circuitry 104 that the forwarding circuitry data objects associated with the transaction have been modified.

For example, in one configuration, primary control circuitry 102 may have requested that forwarding circuitry 106 modify the forwarding circuitry data objects (as was described above in relation to FIG. 3) prior to attempting to notify backup control circuitry 104 that primary control circuitry 102 has modified the control circuitry data objects but may have become non-operational before it was able to notify backup control circuitry 104. Accordingly, forwarding circuitry 106 may have received the request to modify the forwarding circuitry data objects from primary control circuitry 102 and may have modified the forwarding circuitry data objects per the request. In this example, upon receiving the notification from forwarding circuitry 106, backup control circuitry 104 may conclude, at 422 that the transaction is complete and may remove the transaction request from the queue.

However, if backup control circuitry 104 determines, at 416, that it has not received notification (e.g., from primary control circuitry 102 or from forwarding circuitry 106) that the forwarding circuitry data objects have been modified, backup control circuitry 104 may, at 420, audit forwarding circuitry 106 to determine whether the forwarding circuitry data object modifications associated with the transaction were performed. If the forwarding circuitry data object modifications associated with the transaction have not been performed, backup control circuitry 104 may request that forwarding circuitry 106 perform the forwarding circuitry data object modifications associated with the transaction and may wait for acknowledgement that the forwarding circuitry data object modifications associated with the transaction have been performed. Once the forwarding circuitry data object modifications associated with the transaction have been performed, backup control circuitry 104 may determine, at 422, the transaction is complete and may delete the transaction request from the queue.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
using primary control circuitry of the packet switch, receiving a request to perform a transaction wherein the primary control circuitry performing the transaction comprises determining a plurality of actions associated with the transaction and a plurality of first data objects associated with the plurality of actions, the plurality of first data objects being stored in a memory of the primary control circuitry and modifying the plurality of first data objects;
in response to the receiving, the primary control circuitry, forwarding the request to backup control circuitry of the packet switch;
subsequent to the forwarding, the primary control circuitry performing the transaction by determining the plurality of actions, determining the first data objects, and modifying the first data objects;
using the primary control circuitry, informing the backup control circuitry that the primary control circuitry has performed the transaction; and
in response to the informing, the backup control circuitry performing the transaction by modifying a plurality of second data objects stored in a memory of the backup control circuitry, the first data objects corresponding to the second data objects;
wherein the primary control circuitry and the backup control circuitry are synchronized on a transaction basis;
wherein the determining of the plurality of actions associated with the transaction further comprises determining that a plurality of third data objects stored in a memory of forwarding circuitry of the packet switch are also associated with the transaction; and
using the primary control circuitry, requesting that the forwarding circuitry modify the plurality of third data objects;
in response to the requesting, the forwarding circuitry modifying the plurality of third data objects;
in response to the requesting, the primary control circuitry receiving acknowledgement of the modifications to the plurality of third data objects, and wherein the primary control circuitry is incapable of directly modifying the plurality of third data objects independent of the forwarding circuitry.

2. The method of claim 1 further comprising the primary control circuitry validating the transaction prior to performing the transaction by determining that the primary control circuitry has adequate resources to perform the transaction.

3. The method of claim 1 wherein the request does not identify the first data objects or the second data objects.

4. An article of manufacture comprising media comprising programming configured to cause processing circuitry to perform the method of claim 1.

5. The packet switch operating method of claim 1 wherein the transaction is a first transaction, and further comprising the backup control circuitry processing a different second transaction having a different transaction identifier than the first transaction, the second transaction comprising modifying at least one of the configuration parameters modified in the first transaction and modifying at least one other configuration parameter of the packet switch not modified in the first transaction.

6. The packet switch operating method of claim 1 wherein the forwarding of the request to the backup control circuitry comprises forwarding the request prior to the primary control circuitry modifying the first data objects.

7. The packet switch operating method of claim 6 further comprising preventing the backup control circuitry from requesting that the forwarding circuitry modify the plurality of third data objects.

8. The packet switch operating method of claim 7 further comprising:
in response to the informing, the backup control circuitry determining that the plurality of third data objects are associated with the transaction; and
the backup control circuitry receiving a notification that the modifications to the plurality of third data objects are complete.

9. A packet switch comprising:
forwarding circuitry configured to forward packets between ports of the packet switch;
first control circuitry comprising first memory, the first control circuitry being connected to the forwarding circuitry and configured to configure the forwarding circuitry;
second control circuitry comprising different second memory, the second control circuitry being connected to the forwarding circuitry, connected to the first control circuitry, and configured to configure the forwarding circuitry when the first control circuitry is non-operational; and
wherein for a received request to perform a transaction, the first control circuitry is configured to forward the request to the second control circuitry prior to performing the transaction, to perform the transaction by determining a plurality of first data objects associated with the transaction, the plurality of first data objects being stored in the first memory and modifying the plurality of first data objects, and to notify the second control circuitry that the transaction has been performed and the second control circuitry is configured to receive the request from the first control circuitry and, after being notified that the first control circuitry has performed the transaction, to also perform the transaction by modifying a plurality of second data objects stored in the second memory, the second data objects corresponding to the first data objects; and wherein the first control circuitry and the second control circuitry are synchronized on a transaction basis;
wherein a plurality of third data objects are stored in a memory of forwarding circuitry of the packet switch are also associated with the transaction; and
wherein the first control circuitry is configured to request that the forwarding circuitry modify the plurality of third data objects;
in response to the request from the first control circuitry, the forwarding circuitry modifies the plurality of third data objects;
in response to the request from the first control circuitry, the first control circuitry receives acknowledgement of the modifications to the plurality of third data objects, and wherein the first control circuitry is incapable of directly modifying the plurality of third data objects independent of the forwarding circuitry.

10. The packet switch of claim 9 wherein the request does not identify the first data objects or the second data objects.

11. The packet switch of claim 9 further comprising an input device physically located on the packet switch, the input device being configured to be actuated by a user located proximate to the packet switch and the second control circuitry being configured to replace the functionality of the first control circuitry in response to the input device being actuated.

12. The packet switch of claim 9 wherein the first control circuitry is configured to identify the first data objects for the second control circuitry.

13. The packet switch of claim 9 wherein the first control circuitry is configured to:
determine, prior to performing the transaction, that performing the transaction will result in an error;
prevent the first control circuitry from performing the transaction based on the determination; and
notify the second control circuitry of the determination;
wherein the second control circuitry is configured to disregard the request to perform the transaction in response to receiving the notification of the determination; and
wherein the determining comprises determining without modifying any data objects associated with the transaction.

14. The packet switch of claim 9 wherein the second control circuitry is configured to:
receive the request to perform the transaction before the first control circuitry completes the transaction; and
delay performing the transaction until the first control circuitry has performed the transaction.

15. A packet switch operating method comprising:
using primary control circuitry of the packet switch, receiving a request to perform a transaction wherein the primary control circuitry performing the transaction comprises determining a plurality of actions associated with the transaction and a plurality of first data objects associated with the plurality of actions, the plurality of first data objects being stored in a memory of the primary control circuitry, and modifying the plurality of first data objects;
in response to the receiving, the primary control circuitry forwarding the request to backup control circuitry of the packet switch;
subsequent to the forwarding, the primary control circuitry performing the transaction by determining the plurality of actions, determining the first data objects, and modifying the first data objects;

using the primary control circuitry, informing the backup control circuitry that the primary control circuitry has performed the transaction; and in response to the informing, the backup control circuitry performing the transaction by modifying a plurality of second data objects stored in a memory of the backup control circuitry, the first data objects corresponding to the second data objects;

wherein the primary control circuitry and the backup control circuitry are synchronized on a transaction basis;

wherein the determining of the plurality of actions associated with the transaction further comprises determining that a plurality of third data objects stored in a memory of forwarding circuitry of the packet switch are also associated with the transaction;

using the primary control circuitry, requesting that the forwarding circuitry modify the plurality of third data objects;

in response to the requesting, the forwarding circuitry modifying the plurality of third data objects; and preventing the backup control circuitry from requesting that the forwarding circuitry modify the plurality of third data objects.

16. The method of claim 15 further comprising the primary control circuitry validating the transaction prior to performing the transaction by determining that the primary control circuitry has adequate resources to perform the transaction.

17. The method of claim 15 wherein the request does not identify the first data objects or the second data objects.

18. The method of claim 15 wherein the forwarding of the request to the backup control circuitry comprises forwarding the request prior to the primary control circuitry modifying the first data objects.

19. The method of claim 15 further comprising in response to the requesting, the primary circuitry receiving acknowledgement of the modifications to the plurality of third data objects, and wherein the primary control circuitry is incapable of directly modifying the plurality of third data objects independent of the forwarding circuitry.

20. The method of claim 15 further comprising:
in response to the informing, the backup control circuitry determining that the plurality of third data objects are associated with the transaction; and
the backup control circuitry receiving a notification that the modifications to the plurality of third data objects are complete.

21. A packet switch comprising:
forwarding circuitry configured to forward packets between ports of the packet switch;
first control circuitry comprising first memory, the first control circuitry being connected to the forwarding circuitry and configured to configure the forwarding circuitry;
second control circuitry comprising different second memory, the second control circuitry being connected to the forwarding circuitry, connected to the first control circuitry, and configured to configure the forwarding circuitry when the first control circuitry is non-operational; and
wherein for a received request to perform a transaction, the first control circuitry is configured to forward the request to the second control circuitry prior to performing the transaction, to perform the transaction by determining a plurality of first data objects associated with the transaction, the plurality of first data objects being stored in the first memory and modifying the plurality of first data objects, and to notify the second control circuitry that the transaction has been performed and the second control circuitry is configured to receive the request from the first control circuitry and, after being notified that the first control circuitry has performed the transaction, to also perform the transaction by modifying a plurality of second data objects stored in the second memory, the second data objects corresponding to the first data objects; and wherein the first control circuitry and the second control circuitry are synchronized on a transaction basis;

wherein a plurality of third data objects are stored in a memory of forwarding circuitry of the packet switch are also associated with the transaction; and wherein the first control circuitry is configured to request that the forwarding circuitry modify the plurality of third data objects;

in response to the request from the first control circuitry, the forwarding circuitry modifies the plurality of third data objects;

wherein the second control circuitry is prevented from requesting that the forwarding circuitry modify the plurality of third data objects.

22. The packet switch of claim 21 wherein the request does not identify the first data objects or the second data objects.

23. The packet switch of claim 21 further comprising an input device physically located on the packet switch, the input device being configured to be actuated by a user located proximate to the packet switch and the second control circuitry being configured to replace the functionality of the first control circuitry in response to the input device being actuated.

24. The packet switch of claim 21 wherein the first control circuitry is configured to identify the first data objects for the second control circuitry.

25. The packet switch of claim 21 wherein the first control circuitry is configured to:
determine, prior to performing the transaction, that performing the transaction will result in an error;
prevent the first control circuitry from performing the transaction based on the determination; and
notify the second control circuitry of the determination;
wherein the second control circuitry is configured to disregard the request to perform the transaction in response to receiving the notification of the determination; and
wherein the determining comprises determining without modifying any data objects associated with the transaction.

26. The packet switch of claim 21 wherein the second control circuitry is configured to:
receive the request to perform the transaction before the first control circuitry completes the transaction; and
delay performing the transaction until the first control circuitry has performed the transaction.

* * * * *